United States Patent [19]

Kincheloe et al.

[11] 4,377,111
[45] Mar. 22, 1983

[54] CASSETTE STACKING DEVICE

[75] Inventors: David Kincheloe, West Chicago; David Neathery, Wheaton, both of Ill.

[73] Assignee: King Instrument Corporation, Westboro, Mass.

[21] Appl. No.: 98,124

[22] Filed: Nov. 28, 1979

[51] Int. Cl.³ .......................................... B65G 57/30
[52] U.S. Cl. ........................................ 101/44; 29/806; 198/374; 414/31; 414/33; 414/55; 414/96; 414/786
[58] Field of Search .................... 414/31, 32, 33, 55, 414/96, 786; 242/56 R; 101/44; 198/374; 29/806, 809

[56] References Cited

U.S. PATENT DOCUMENTS

| | | | |
|---|---|---|---|
| 2,547,602 | 4/1951 | Schmitt | 101/44 |
| 3,112,038 | 11/1963 | Breivik | 414/96 |
| 3,220,570 | 11/1965 | Swanson et al. | 414/96 X |
| 3,225,689 | 12/1965 | Fuchs et al. | 101/44 |
| 3,516,532 | 6/1970 | Calistrat | 198/374 |
| 3,717,923 | 2/1973 | Arai et al. | 29/806 X |
| 3,814,343 | 6/1974 | Bennett et al. | 242/56 R |
| 4,024,963 | 5/1977 | Hautau | 414/96 X |
| 4,061,286 | 12/1977 | King et al. | 242/58.4 X |
| 4,245,940 | 1/1981 | Luther | 414/95 |

FOREIGN PATENT DOCUMENTS

2432579  1/1976  Fed. Rep. of Germany.

*Primary Examiner*—Leslie J. Paperner
*Attorney, Agent, or Firm*—Schiller & Pandiscio

[57] ABSTRACT

An automatic cassette stacking apparatus has first and second three-sided chutes connected to a stacker chute. A cassette to be stacked is moved through the first three-sided chute and can be stamped with a date. The cassette then moves through the second three-sided chute where it is selectively oriented. The cassette from the second chute is then placed on the bottom of a stack of cassettes in the stack chute.

23 Claims, 9 Drawing Figures

CASSETTE STACKING DEVICE

BACKGROUND OF THE INVENTION

1. Field of the Invention

The invention pertains to an apparatus for stacking cassettes which have been loaded with magnetic tape.

2. The Prior Art

Machines are available which will automatically load a new, empty, cassette with tape. One of these machines is commercially made by the King Instrument Corporation of Westboro, Mass. U.S. Pat. No. 4,061,286 describes and illustrates the King machine which can load tape into a cassette at a substantially high rate. Because of the speed of the King machine, there has been a problem with automatically and properly handling the loaded cassettes once the King machine has ejected them.

SUMMARY OF THE INVENTION

The invention comprises a method and an apparatus for automatically receiving, date stamping, tab inserting, and selectively stacking cassettes which have been loaded with tape by an adjacent cassette loading apparatus.

The inventive apparatus includes a first three-sided chute, having a bottom and two sides, which is oriented at a selected angle with respect to the horizontal. When a loaded tape cassette is ejected by the tape loading apparatus, it drops onto the three-sided U-shaped chute and slides down the end of that chute until it comes to rest at an operating station, against an opto-electronic sensing block. Once the loaded cassette has come to rest against the optical sensing block, an electrical signal is generated which can activate an electrical-pneumatic solenoid to operate a date-stamping mechanism which will stamp select indicia, such as a date on a selected portion of the cassette. Additionally, if desired, a second electrical-pneumatic solenoid can be actuated which will cause a rectangular plastic tab to be forced onto the two reels of the cassette locking them in a predetermined position.

Once the date-stamping and tab-inserting operations have been completed, a third pneumatic cylinder retracts an ejector door which drops the cassette onto a second chute, or base plate, which is downwardly oriented at a selected angle with respect to the horizontal. The ejected cassette slides down the second chute with one of two orientations. A pair of upwardly extendable pins which are solenoid actuated, determines which of the two orientations the cassette assumes.

At the lower end of the second chute, the cassette enters a stacker mechanism. The stacker mechanism is actuated by another pneumatic cylinder which receives its control signal from the cassette loading machine. When actuated, the stacking apparatus lifts the cassette vertically, past a pair of pivotable pawls and onto the bottom of a stack of cassettes held in a two-stacking chute. The pawls can only rotate upwardly from a horizontally extending position to an essentially vertical position. As the stacker mechanism retracts, the stack of cassettes drops back onto the pawls and is held above the stacker mechanism.

The upwardly extendable pins in the second downwardly oriented chute or base plate may be alternately retracted and extended depending on the setting of a control switch. Thus, cassettes may be alternately stacked with opposite orientations, thereby resulting in the most compact stack possible. Additionally, the stamper mechanism and the tab-inserting mechanism each have an on/off switch and may be controlled independently.

The stacking apparatus also includes an ejection chute which is actuated by the cassette loading machine. If the cassette loading machine detects a defect in the loaded cassette, it can retract the ejection chute. When the defective cassette is ejected from the tape loading machine, instead of sliding down the first three-sided downwardly oriented chute, it drops through the bottom of the chute into a reject bin.

The inventive method includes the steps of: moving the cassette from a rest position; deflecting the moving cassette at a selected angle and causing it to assume a selected orientation; stacking the oriented cassette onto a stack of cassettes.

DETAILED DESCRIPTION OF THE PREFERRED EMBODIMENTS

Not by way of limitation, but by way of disclosing the best mode of practicing our invention, and by way of enabling one of ordinary skill in the art to practice our invention, one embodiment of our invention is shown in FIGS. 1 through 9. It will be understood that while the exemplary embodiment of our invention disclosed herein is disclosed in conjunction with an apparatus for loading tape into a cassette, our cassette stacking mechanism, and the associated method, are usable with other types of cassette feeding devices.

Figures 1, 2:
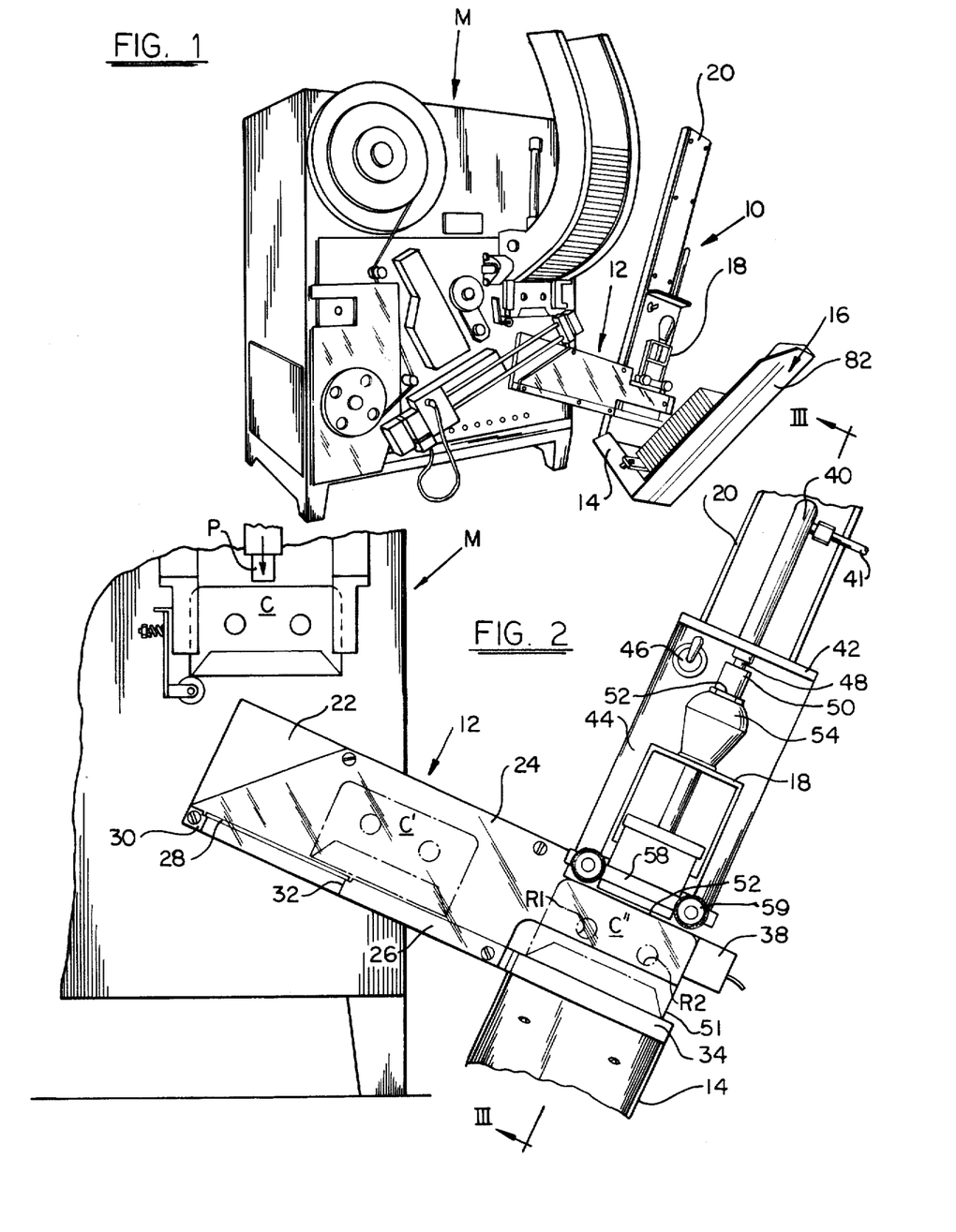
FIG. 1 is a perspective view of one embodiment of a cassette stacking apparatus attached to an associated tape loading machine, the associated tape loading machine being similar to the tape loading machine described and illustrated in U.S. Pat. No. 4,061,286.
FIG. 2 is an enlarged, fragmentary planar view of a section of the cassette stacker of FIG. 1.

In FIG. 1, an apparatus M for loading tape into a cassette is shown along with a cassette stacking apparatus 10. The apparatus M could be a commercially available machine such as King Instrument Corporation Model No. 750. The stacker mechanism 10 includes a first, three-sided, downwardly oriented, elongated U-shaped chute 12, a second downwardly oriented chute or base plate 14, a two-sided, elongated, stacker chute 16, a date stamping device 18, and a tab hopper 20.

With respect to FIG. 2, the chute 12 has first and second elongated sides 22, 24 which are joined by elongated bottom 26. A horizontally movable ejector door 28 is located at an upper end 30 of the chute 12.

When the cassette loading apparatus M has inserted a selected amount of tape into the cassette C, the cassette C is pushed downwardly by a plunger P controlled by the tape loading apparatus M. If the tape loading apparatus M has detected that the cassette C is defective, the horizontally slidable door 28 will be retracted by a solenoid under the control of the tape loading machine M. As the cassette C is pushed downwardly by the plunger P, it will drop through a slot 32, created by the retraction of the horizontally slidable door 28, into a reject pile. If the tape loading apparatus M does not detect a defect in the cassette C, the door 28 will not be retracted, and the cassette C will slide down the chute 12 as indicated by the cassette C' in phantom in FIG. 2, from the upper end 30 of the chute 12 toward the lower end 34 of the chute 12.

In a preferred embodiment, the chute 12 is 13 inches long, and one-half inch wide, with a three-quarter inch wide opening where the cassette C drops into the chute 12 from the tape loading apparatus M. Additionally, the chute 12 is oriented at a 25° angle downwardly with respect to the horizontal.

The cassette C' slides downwardly in the chute 12 toward the end 34 until it encounters an optical block 38. The optical block or opto-electronic sensing means 38, which is attached to the lower end 34 of the chute 12, halts further motion of the cassette C'' at an operating station. The optical block 38 includes a light emitting diode and a photo transistor, both to be discussed subsequently. With the cassette C'' located adjacent the optical block 38, as shown in FIG. 2, a light path between the light emitting diode and the photo transistor in the optical block 38 is interrupted.

When the cassette C'' has broken the light path in the optical block 38 for 0.1 seconds, a control circuit, to be discussed subsequently, electrically energizes an electrical-pneumatic solenoid which controls the air supplied to a pneumatic air cylinder 40 through a tube 41. The cylinder 40 is attached to a member 42 of the bracket 44 which in turn is fastened to the tab hopper 20 and a base plate mounting member 45. An on/off switch 46 also attached to the bracket 44 controls whether or not the cylinder 40 is activated. If the switch 46 is in the "on" position, the electro-pneumatic solenoid supplies air through the tube 41 to the cylinder 40 to cause a piston member 48 to move downwardly and, in turn, push a stamper push block 50 against an upper surface 52 of a handle 54 of the stamper 18. As the handle 54 of the stamper 18 is driven downwardly, the stamper 18 applies a date stamp or any other desired indicia to an upper surface 52 of the cassette C''. The stamper 18 is optional and may be a commercial device which is readily available. The actuation of the stamper 18 is delayed slightly by the solenoid actuated air flow valve which is in series with the pneumatic cylinder 40. Additionally, there is an air pressure regulator in series with the flow valve which adjusts the stamping pressure. A plate 58 and screws 59 lock the stamper 18 mechanically in position.

Simultaneously with energizing the electro-pneumatic solenoid and cylinder 40, which actuates the stamper 18, a tab inserting air cylinder is energized. The tab inserting air cylinder inserts a tab into the cassette C''. The tab locks the reels R1, R2 of the cassette C'' preventing movement of the tape. The same electro-pneumatic solenoid could be used to actuate both the stamper cylinder 40 and the tab inserting cylinder. The tab inserting mechanism is also optional.

Figure 3:
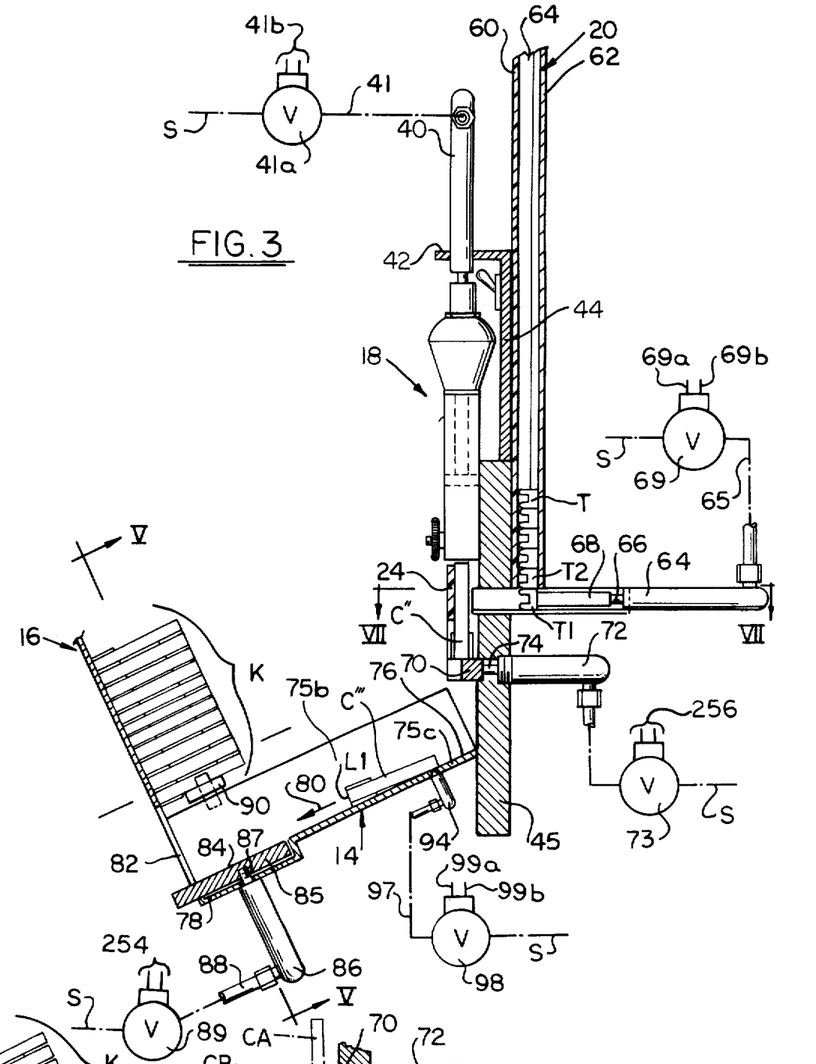
FIG. 3 is a sectional view taken along line III—III of FIG. 2 showing a cassette C′″ with a first orientation.

FIG. 3, a view partly in section, shows the bracket 44 which is attached to the tab hopper 20. The tab hopper 20 has a transparent front member 60, and a spaced apart, parallel, rear member 62. The members 60, 62 are held rigidly apart by an elongated side member 64. As can be seen in FIG. 3, a stack of tabs T can be loaded into the hopper 20. The tab air cylinder 64 is shown in FIG. 3. The tab air cylinder 64 receives air through a tube 65 and has a horizontally movable piston 66 which drives a tabber pusher plate 68 axially with respect to the cylinder 64 and pushes the lowest tab T1 onto the two reels R1, R2 of the cassette C''. When the tabs T are loaded into the tab hopper 20, the lowest tab T1 falls directly in front of the tabber push plate 68. The push plate 68 is no higher than the tab T1. When the push plate 68 is pushed forward by the cylinder 66 inserting the tab T1 into the cassette C'', it travels under the next tab T2. The push plate 68 is longer than the stroke of the cylinder 66 so that the tab T2 does not fall until the push plate 68 is retracted. A solenoid actuated valve 69 is connected between a source of air S and the supply tube 65 for the pusher air cylinder 64. A similar solenoid actuatable valve 41a is connected between the source of air S and the tube 41. The valve 69 is opened by an electrical signal supplied to a pair of solenoid inputs 69a, 69b. The valve 41a actuated by an electrical signal applied to the terminals 41b. The signal, generated by the control circuit to be discussed subsequently, actuates the cylinders 40, 64 for about 0.33 seconds.

In order to eject the cassette C'' from the operating station at the end 34 of the chute 12, an elongated flipper platform 70 is retracted by a pneumatic cylinder 72. The pneumatic cylinder 72 is actuated by the tape loading machine M. When the shaft block on the tape loading apparatus M shifts, the cylinder 72 is actuated by a valve 73 and axially retracts a piston 74 which is connected to the flipper platform 70. The cylinder 72 could be actuated alternately by any other means which could generate a control signal at an appropriate time. With the flipper platform 70 retracted, the cassette C'' drops vertically onto the second chute 14. The chute 14 is U-shaped with a pair of parallel, spaced apart sides 75a, 75b and a base plate 75c. The base plate 75c is attached to the base plate mountings 45 and is oriented at a 25° angle with respect to the horizontal. When the cassette C'' drops onto a surface 76 of the base plate 75c, it may assume one of two orientations. A cassette C''' is shown on the base plate 75c having one of the two selected orientations. In this case, the cassette C''' is oriented with its leader L1 toward a lower end 78 of the base plate 75c. Under the influence of gravity, the cassette C''' moves downwardly along the base plate 75c in a direction 80 toward the lower end 78.

The cassette C''' moves downwardly toward the end 78, in the direction 80, until it encounters a side 82 of the stacker trough 16. When the cassette C''' is located adjacent the side 82 of the stacker trough 16, it is also sitting on a top surface 84 of a rectangular push plate 85 which is actuated by a pneumatic cylinder 88. The push plate 85 is connected to a piston 87 that can be moved axially in the cylinder 86. When the cylinder 86 is actuated by an airline 88, and a solenoid actuated valve 89, the push plate 85 is raised vertically with respect to the base plate 75c driving the cassette C''' over a pawl mechanism 90. The pawl mechanism 90 holds a stack of cassettes K within the stacker trough 16. As each new cassette, such as the cassette C''' is released by retracting the flipper platform 70, it subsequently slides down the base plate 75c onto the stacker push plate 85. When the pneumatic cylinder 86 forces the cassette C''' upward, the stack K has its length increased by one cassette from the bottom. The cylinder 86 is actuated through the valve 89 simultaneously with an upstroke of the slide cylinders of the machine M. The cylinder 86 could, however, be actuated by any other means which could generate a control signal at a selected time.

A pair of pneumatic cylinders 94 have pins 96 that can be extended through a pair of holes in the plate 75c about one-half inch above the surface 76. When so extended, the pins deflect the cassette C''' causing it to assume a second orientation with its leader toward the base plate mounting member 45. The pins 96 are extended by air pressure supplied to the cylinder 94 through a line 97 connected to an electro-pneumatic solenoid valve 98 with electrical inputs 99a, 99b.

Figure 4:
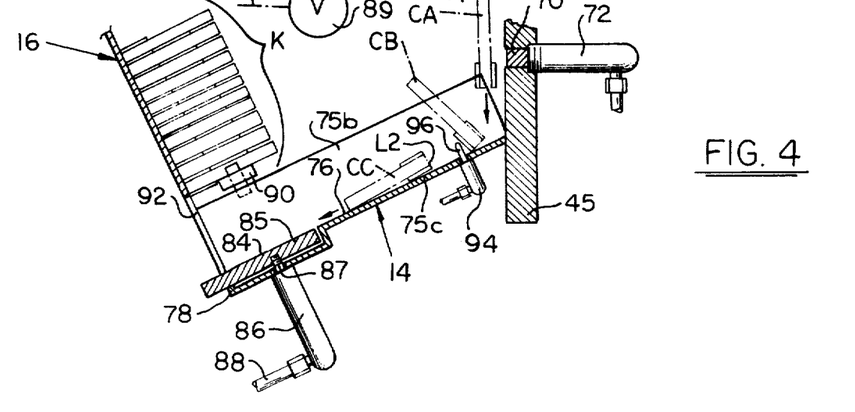
FIG. 4 is a sectional view, substantially corresponding to the view of FIG. 3 showing a cassette CC with a second orientation.

FIG. 4 shows the pins 96 extended from the flipper cylinders 94 and extending above the surface 76 of the base plate 75c. FIG. 4 also shows the flipper platform 70 in its retracted position with a cassette CA in the process of dropping downward toward the chute 14. A cassette CB, corresponding to the cassette CA, but slightly later in time, is shown in FIG. 4 "tripping" over the extended pins 96 and assuming a second orientation. The second orientation is shown as cassette CC, corresponding to cassette CB, but later in time, with a leader L2 oriented toward the base plate 45. The cassette CC then slides down toward the lower end 78 of the base plate 75c as previously discussed.

Figure 5:
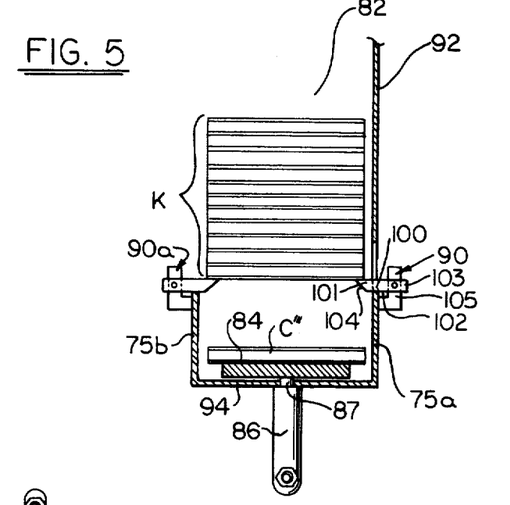
FIG. 5 is a view in section taken along line V—V of FIG. 3.

FIG. 5 is an end view looking toward the base plate mounting member 45. FIG. 5 shows the stacker actuation cylinder 86 which is connected by the piston element 87 to the stacker push plate 85. The cassette C''' is shown laying on the top surface 84 of the push plate 85. As further can be seen in FIG. 5, the stacker hopper 16 which has the upper side member 82 located at right angles to a second upper side member 92 is connected to the side 75a of the chute 14. The side walls 75a, 75b each support a pawl 90, 90a. The pawls 90, 90a are identical. A description of the pawl 90 will also describe the pawl 90a. The pawl 90 has a rigid flat member 100 which has two elongated sides 101, 102 joined by a perpendicular side 103 and an inwardly oriented biased side 104. The member 100 is pivotably attached to an L-shaped mounting bracket 105. The bracket 105 is rigidly attached to the side wall 75a. The pawl member 100 is adapted to be able to rotate vertically upward away from the push plate 85 in response to the stacker push plate 85 pushing the cassette C''' upward past the pawl 90. Additionally, the member 100 is adapted to drop back to a horizontal orientation and to support on the upper surface 101 the stack of cassettes K. Thus, when the push plate 85 pushes the cassette C''' upward, the two pivotable members, such as the member 100, of the pawls 90, 90a are pushed vertical by the cassette C''' enabling the cassette C''' to pass the pawls 90, 90a. Once the cassette C''' has passed the pawls 90, 90a, the pivotably mounted members, such as the member 100, drop into their horizontal position and provide a stable platform on which the stack of cassettes K, whose height has been increased by the addition of the cassette C''' to the bottom, may rest.

Figure 6:
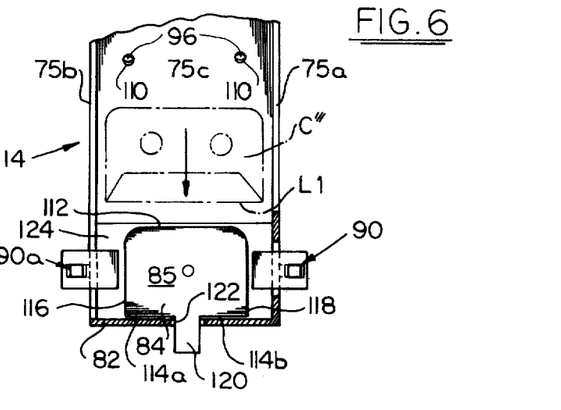
FIG. 6 is a top, planar view of the mechanism which lifts stamped and oriented cassettes onto the bottom of the stack of cassettes in the two-sided stacking chute.

In FIG. 6, the cassette C''' is shown sliding down the second three-sided chute 14, toward the push plate 85. FIG. 6 shows the pins 96 which are actuated by the pneumatic cylinders 94 and which can cause the cassettes to drop off of the flipper platform 70 and to assume the second desired orientation with their leader toward the base plate mounting member 45. The pins 96 extend upward through the floor member 75c of the three-sided chute 14 through holes 110. The push plate 85 has an essentially rectangular shape with an edge 112 parallel to an edge composed of a part 114a and a part 114b. Two perpendicular sides 116 and 118 join the sides 112 and 114. A rectangular tab 120 is attached to the push plate 85 between the two edges 114a and 114b. The tab 120 rides vertically within a slot 122 of the side 82 of the stacker chute 16. In a retracted position, the push plate 85 is moved adjacent a lower surface 124 at the end 78 of the three-sided chute 14.

Figure 7:
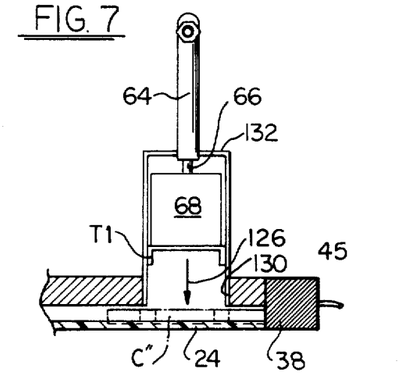
FIG. 7 is a view in section taken along line VII—VII of FIG. 3.

FIG. 7 is a view of the tabber push plate 68 being extended in a direction 126 to push the tab T1 into the cassette C''. The tab T1 passes through an opening 130 in the base plate member 45. A rectangular, somewhat elongated, bracket 132 supports the pneumatic cylinder 64, the tabber push plate 68 and the tab T1 being pushed into the cassette C'' with respect to the base plate mounting member 45.

Figure 8:
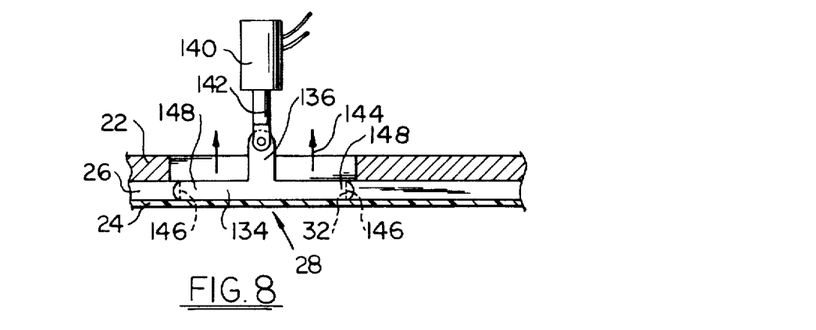
FIG. 8 is a top planar view of the defective cassette ejection mechanism.

FIG. 8 shows the ejector plate 28 which is mounted in the floor 26 of the first three-sided chute 12. The plate 28 is a T-shaped member having an elongated portion 134 joined to a shorter stem portion 136. A solenoid 140 which receives its operating signals from the machine M and which is connected to the member 28 via a linkage arm 142 can retract the member 28 in a direction 144 away from the bottom 26 of the three-sided chute 12. In the retracted condition, a cassette C ejected by the machine M will drop through the opening 32 normally covered by the T-shaped plate 28. The elongated member 134 of the T-shaped plate 28 is about 5½ inches long. The plate 28 is supported on two lips 146 which provide surfaces that ends 148 of the member 134 can slide on.

Figure 9:
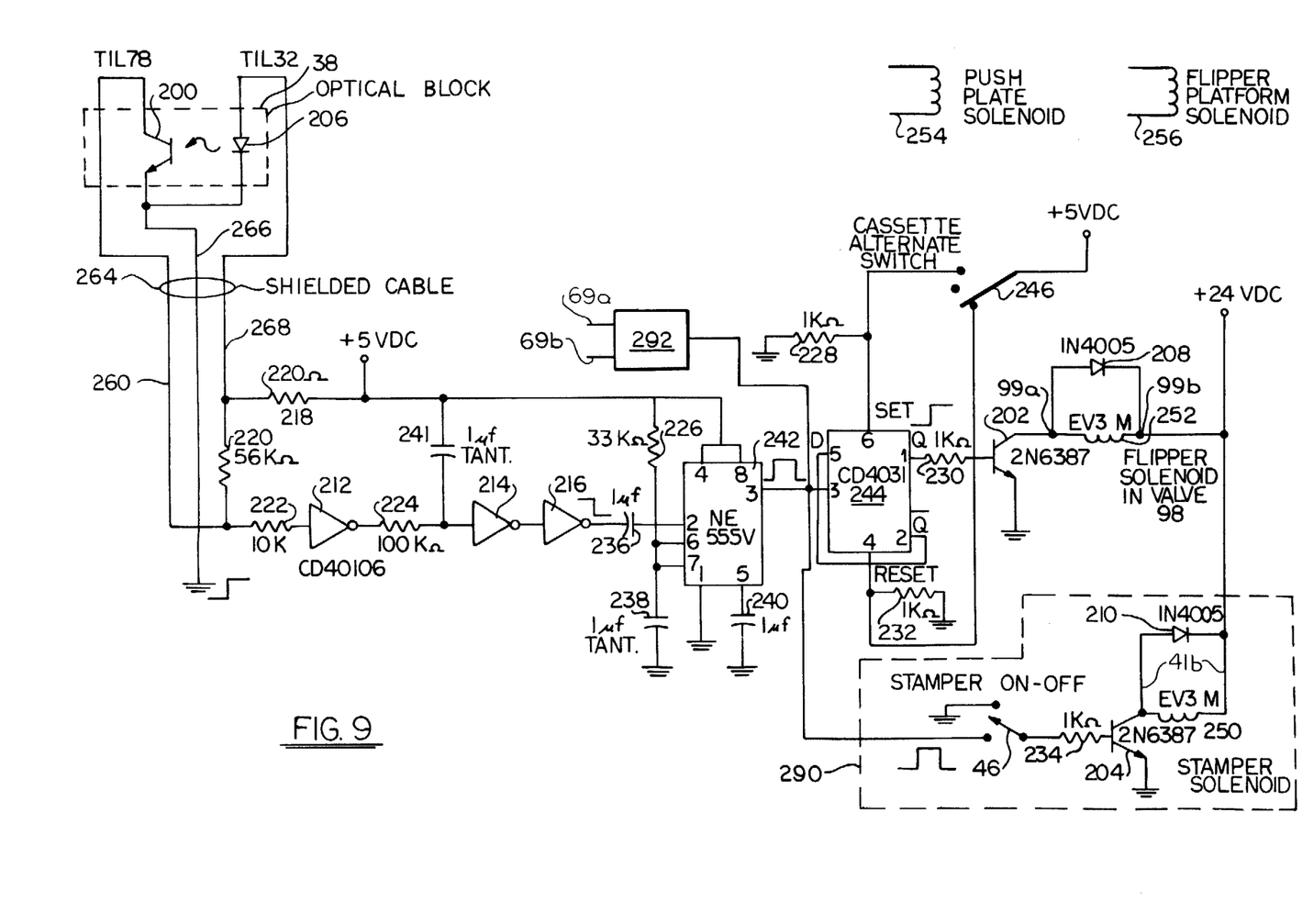
FIG. 9 is a schematic diagram of an exemplary control circuit.

FIG. 9 is a schematic of a control circuit usable with the chute 10. The exemplary control circuit of FIG. 9 includes a photo transistor 200, drive transistors 202, 204, a light emitting diode 206, transient suppression diodes 208, 210, Schmitt trigger inverters 212 through 216, resistors 218 through 234, capacitors 236 through 241, solid state timer 242, D-flip-flop 244, control switches 46 and 246, and electro-pneumatic solenoid coils 250 through 256. The coils 250–256 electrically open and close the associated valves 41a, 69, 73, 89, 98 that regulate the flow of air to the pneumatic cylinders 40, 64, 72, 86, 94. A suitable electro-pneumatic solenoid actuated valve is the model EV3M sold by Clippard.

The photo transistor 200 and the light emitting diode 206 are mounted in the optical block 38. A collector of the transistor 200 is connected to a conductor 260 which is in a shielded cable 264. The conductor 260 is also connected to a first terminal of the resistor 220 and a second terminal of the resistor 222. An emitter of the photo transistor 200 and a cathode of the diode 206 are connected to an electrical conductor 266 which is also located in the shielded cable 264. The conductor 266 is connected to electrical ground. An anode of the light emitting diode 206 is connected to a conductor 268 which is also located in the shielded cable 264. The conductor 268 is connected to a first terminal of the resistor 218 and a second terminal of the resistor 220. A second terminal of the resistor 218 is connected to a regulated five-volt DC supply. A second terminal of the resistor 222 is connected to an input of the inverting Schmitt trigger 212. An output of the inverting Schmitt trigger 212 is connected to a first terminal of the resistor 224. A second terminal of the resistor 224 is connected to a first terminal of the capacitor 241 and to an input of the inverting Schmitt trigger 214. A second terminal of the capacitor 241 is connected to the five-volt regulated DC supply. An output of the inverting Schmitt trigger 214 is connected to an input of the inverting Schmitt trigger 216. An output of the inverting Schmitt trigger 216 is connected to a first terminal of the capacitor 236. A second terminal of the capacitor 236 is connected to an input of the solid state timer 242. A first terminal of the resistor 226 is connected to the five-volt regulated DC supply. A second terminal of the resistor 226 is connected to selected inputs of the timer 242 and to a first terminal of the capacitor 238. A second terminal of the capacitor 238 is connected to electrical ground. The solid state timer 242 is selectively connected between the five-volt DC supply and the electrical ground. A first terminal of the capacitor 240 is connected to a selected terminal of the solid state timer. A second terminal of the capacitor 240 is connected to electrical ground. An output of the timer 242 is connected to a clock input of the D-flip-flop 244 and to a terminal of the single pull double-throw control switch 46. A D-input of the D-flip-flop 244 is connected to a negated output of the flip-flop 244. A set input of the D-flip-flop 244 is connected to a first terminal of a resistor 228 and a first terminal of the single-pole three-position switch 246. A second terminal of the resistor 228 is connected to electrical ground. A reset input of the D-flip-flop 244 is connected to a first terminal of the resistor 232 and to a second input of the single-pole three-position switch 246. A pole of the switch 246 is connected to the five-volt regulated DC supply. A second terminal of the resistor 232 is connected to electrical ground. An asserted output of the D-flip-flop 244 is connected to a first terminal of the resistor 230. A second terminal of the resistor 230 is connected to a base of the transistor 202. An emitter of the transistor 202 is connected to electrical ground. A collector of the transistor 202 is connected to the first terminal 99a of the solenoid coil 252 of the valve 98 and to an anode of the diode 208. The second terminal 99b of the solenoid coil 252 is connected to a cathode of the diode 208 and to a 24-volt DC solenoid power supply. A second terminal of the switch 46 is connected to electrical ground. A pole of the switch 46 is connected to the first terminal of the resistor 234. A second terminal of the resistor 234 is connected to a base of the transistor 204. An emitter of the transistor 204 is connected to electrical ground. A cathode of the transistor 204 is connected to a first terminal of the solenoid coil 250 of the stamper and tabber control valve and to an anode of the diode 210. A cathode of the diode 210 and a second terminal of the coil 250 are connected to the 24-volt DC solenoid supply. The solenoid coils 254 and 256 are connected so as to be energized by selected signals from the King machine M. When the solenoids 254 and 256 are energized, their associated valves 89 and 73 open and supply air pressure to the cylinders 86 and 72, respectively, to light the push plate 85 and retract the platform 74.

A push plate solenoid driver 292 with the same schematic as the stamper solenoid driver 290 can be used to actuate the valve 69.

Normally, with no cassette adjacent the optical block 38, light is transmitted from the diode 206 to the transistor 202. As a result, there is a low potential signal at the junction of the resistors 220 and 222, which results in a high output signal at the output of the inverting Schmitt trigger 216. In this condition, there is no voltage across the capacitor 241. A time delay which includes the capacitor 241 and the resistor 224 limits the response time of the inverting Schmitt trigger 214 when a cassette slides down the first three-sided chute 12 and hits the optical block 38. The impact of the cassette hitting the optical block 38 causes the cassette to bounce, necessitating the time delay. When the cassette has interrupted the light path between the diode 206 and the transistor 200 for about 0.1 seconds, the voltage at the output of the inverting Schmitt trigger 216 drops, triggering the solid state timer 242. A pulse is generated on output pin 3 of the timer 242 of a width determined by the external components connected to the timer 242. Assuming the switch 46 is in the correct position, the pulse from the timer 242 is transmitted to the base of the transistor 204 which activates the stamper solenoid for approximately 0.33 seconds. The valve 69 is also simultaneously actuatable by the driver 292. This actuates the cylinders 40 and 64. The cassette is thus stamped. Simultaneously a tab is inserted between the reels of the cassette.

If the three-position switch 246 is in its center position, neither the set nor the reset inputs of the flip-flop 242 are activated. Hence, each time a positive going pulse appears at the output of the solid state timer 242, the D-flip-flop 244 changes state. In this condition, current is alternately supplied to the transistor 202 which in turn energizes the solenoid 252 of the valve 98. Alternately energizing the valve 98 raises and lowers the flipper pins 96 through the floor 75c to the second three-sided chute 14. This, thus alternately changes the orientation of the cassettes passing down the chute 14. If the cassette alternate switch 146 is in either of its other positions, the D-flip-flop 244 will be held in either the set or the reset state. The transistor 202 will conduct continuously or not at all. In the case where the transistor 202 is energized continuously, the solenoid 252 is energized continously, thus causing the pins 96 to continuously extend through the floor 75c of the three-sided chute 14. In this condition, all of the cassettes stacked in the stacker 16 will be stacked with their leaders facing outwardly away from the machine M. In the condition where the transistor 202 is not conducting at all, the flipper solenoid 252 is also not energized, resulting in the flipper pins 96 being retracted beneath the floor 75c continuously. The cassettes will be stacked with leaders oriented toward the machine M.

It will be understood that the stacker mechanism 10 may be used without the stamping apparatus, which includes the stamp mechanism 18, and may be used without the tab inserting apparatus, which includes the cylinder 64 and the push plate 68.

While various additional modifications and suggestions might be proposed by those skilled in the art, it will be understood that we wish to include within the claims of the patent warranted hereon all such modifications and changes as reasonably come within our contribution to the art.

We claim as our invention:
1. A cassette stacking apparatus for use with an adjacent machine, comprising:
   an elongated first chute, said chute being mounted at a selected angle with respect to a horizontal and adapted to receive cassettes from the adjacent ma- chine and transport said cassettes to the lower end of said first chute;

stacking means mounted adjacent said lower end of said first chute, said stacking means being adapted to selectively position cassettes received from said lower end of said first chute in a stack;

control means connected to said first chute and to said stacking means, said control means being adapted to detect the presence of a cassette at said lower end of said first chute, to release the detected cassette to said stacking means and to provide selected control signals to said stacking means to cause the released cassette to assume a selected orientation with respect to said stack of cassettes; and tab inserting means connected to said control means for inserting a locking tab to lock the reels of the cassette detected by said control means.

2. A cassette stacking apparatus according to claim 1, further including:

indicia marking means responsively connected to said control means for applying selected indicia to the cassette detected by said control means.

3. A cassette stacking apparatus according to claim 1, wherein said stacking means includes:

a downwardly oriented second chute, affixed adjacent to said lower end of said first chute;

lifting means at the lower end of said second chute; and a stacking chute at said lower end of said second chute adjacent said lifting means and oriented substantially perpendicular to said second chute;

said lifting means being adapted to lift the cassette with its selected orientation from said lower end of said second chute and place it at the bottom of a stack of cassettes supported by said stacking chute.

4. A cassette stacking apparatus according to claim 1, further including:

removal means associated with said first chute adapted to remove a defective cassette from said first chute on command.

5. A cassette stacking apparatus for automatically providing a stack of selectively oriented cassettes comprising:

conveying means including cassette input port and an operating station, said conveying means comprising a downwardly oriented first chute with said operating station being located at the lower end thereof and being adapted to convey a cassette received at said input port to said operating station;

operating means for applying selected indicia to a cassette located at said operating station;

means for applying a locking tab to the reels of a cassette located at said operating station;

removal means adjacent said operating station for removing a cassette from said operating station, said removal means including orienting means for selectively orienting the cassette being removed;

stacking means attached to said removal means, said stacking means being adapted to stack the cassettes selectively oriented by said orienting means; and control means connected to at least said operating means and said removal means, said control means being adapted to sequentially (a) energize said operating means to operate on a cassette located at said operating station, (b) energize said removal means to move the cassette from said operating station, (c) energize said orienting means to selectively orient the cassette for stacking, and (d) energize said stacking means to stack the selectively oriented cassette.

6. A cassette stacking apparatus according to claim 5, wherein:

said indicia applying means includes a pneumatic actuator adapted to selectively drive an indicia applying stamp mechanism against a selected surface of a cassette positioned at said operating station.

7. A cassette stacking apparatus according to claim 5, wherein said removal means comprises a movable platform located so as to support a cassette positioned in said operating station, and means including an acuator coupled to said platform for displacing said platform upon command so as to cause a cassette resting on the platform to fall from said operating station onto a selected region of said removal means.

8. A cassette stacking apparatus according to claim 7, wherein said removal means includes:

a second downwardly oriented chute and said orienting means comprises at least one elongated pin selectively extendable through a selectively located hole in said second chute.

9. A cassette stacking apparatus according to claim 8, wherein said stacking means includes:

a stacking chute with lifting means at a lower end thereof, said stacking chute being located at the lower end of said second chute;

said lifting means being adapted to receive a cassette from said orienting means and to lift said cassette from said second chute and place it at the bottom of a stack of cassettes supported by said stacking chute.

10. A cassette stacking apparatus according to claim 5, wherein said orienting means is electrically operated, and said control means includes:

opto-electronic means for sensing the presence of a cassette in said operating station, electronic means for generating a control signal to energize said operating means, and manually adjustable electronic means for selectively operating said orienting means.

11. A cassette stacking apparatus for use with a cassette loading machine, said apparatus comprising:

(a) transport means adapted to receive a cassette from said loading machine at a first location and convey said cassette from said first location past a second location to a third location, said transport means comprising a first chute having first and second opposite ends, with said first end of said first chute being positioned at said first location and said second end of said first chute being positioned at said second location, with said first chute being inclined so that a cassette admitted into said first chute at said first location will gravity feed along said first chute to said second location, and said first chute including movable stop means at said second end of said first chute so that cassettes feeding along said first chute may be selectively maintained at said second location, and said transport means further comprising a second chute having first and second opposite ends and disposed with said first end of said second chute positioned adjacent said second location, so that a cassette being maintained in said first chute at said second location will enter said first end of said second chute by selective movement of said stop means, and said second end of said second chute being positioned at said third location, with said second chute being inclined so that a cassette admitted into said second chute's first end will move by gravity along said second chute to said third location, and said transport means further comprising cassette orientation control means for selectively interfering with a cassette as it passes from said first chute to said second chute so as to reverse the orientation of the cassette in said second chute;

(b) lifting means adapted to lift a cassette against the force of gravity from said third location to a fourth location;

(c) a rigid frame; and (d) supprting means attached to said frame between said third location and said fourth location and arranged to pass a cassette being lifted from said third location towards said fourth location by said lifting means and to support said passed cassette as said lifting means retreats from said fourth location back towards said third location.

12. A cassette stacking apparatus according to claim 11 further including control means for automatically controlling movement of said movable stop means and operation of said cassette orientation control means.

13. A cassette stacking apparatus according to claim 12 wherein said control means includes a sensor for detecting when a cassette is positioned at said second location.

14. A cassette stacking apparatus according to claim 13 further comprising selectively operable indicia-applying means for applying selected indicia to a cassette positioned at said second location, and further including means for operating said indicia-applying means under the control of said control means.

15. A cassette stacking apparatus according to claim 13 further comprising tab inserting means for inserting a locking tab into the hub holes of a cassette when said cassette is positioned at said second location, and further including means for operating said tab inserting means under the control of said control means.

16. A cassette stacking apparatus according to claim 11 wherein a portion of the floor of said first chute is removable upon command by said cassette loading machine, whereby a cassette proceeding along said first chute may be jettisoned from said first chute before said cassette reaches said second location.

17. In combination with an automatic cassette loading machine adapted to repetitively load cassettes of the type having a first relatively thick side section and a second opposite relatively thin side section and to discharge the cassettes with a uniform orientation in the sequence in which they are loaded, apparatus for receiving the discharged cassettes and stacking them with selected orientation, said apparatus comprising:

a first chute having first and second opposite ends, said first chute being inclined with said second end lower than said first end and being disposed so that a cassette discharged from said cassette loading machine will enter the upper end of said first chute and will move by gravity to the second end of said first chute, and said first chute also being arranged so that each cassette received from said loading machine will be received and will fall along said first chute with its relatively thick side section facing downward and its relatively thin side section facing upward;

selectively removable cassette retention means disposed at the second end of said first chute, said retention means being capable of alternatively (a) retaining a cassette at said second end of said first chute or (b) releasing a cassette from said first chute without any change in cassette orientation;

stacking means disposed at said second end of said first chute and adapted to receive cassettes discharged from said first chute and stack said cassettes with a selected orientation, said stacking means comprising a second inclined chute having first and second opposite ends, said second chute being mounted so that said second end is lower than said first end, and said second chute being mounted proximate to said first chute so that a cassette released from said second end of said first chute will enter said first end of said second chute and move by gravity towards said second end of said second chute, and said first chute and said retention means being arranged so that a cassette released from said first chute will have its first relatively thick side section facing downward as it enters said second chute, and said second chute including orientation means for selectively causing a cassette to (a) reverse its orientation on said second chute, or (b) maintain its existing orientation on said second chute; and control means including means adapted to detect the presence of a cassette at said second end of said first chute, means for moving said retention means so as to cause the release of the detected cassette from said second end of said first chute, and means for operating said stacking means so that the said detected cassette will be stacked with said selected orientation.

18. Apparatus according to claim 17 wherein said orientation means comprises at least one pin adapted to reciprocate between a first position where it projects into said second chute and a second position where it is retracted out of said second chute.

19. Apparatus according to claim 17 wherein said stacking means comprises (a) lifting means at said second end of said second chute for lifting cassettes out of said second chute, and (b) supporting means for supporting a stack of cassettes lifted from said second chute by said lifting means so that the last-lifted cassette is at the bottom of the stack, said lifting means being adapted to reciprocate between a first position below said second chute and a second position above said supporting means, in order that said lifting means may engage a cassette in said second chute and move said cassette past said supporting means as it moves from its said first position to its said second position.

20. Apparatus according to claim 17 further including indicia means for applying selected indicia to each cassette while it is positioned at said second end of said first chute.

21. Apparatus according to claim 17 further including inserting means for inserting hub locking tabs into the cassettes, said inserting means being adapted to insert said locking tabs into said cassettes when said cassettes are positioned at said second end of said first chute.

22. A method of stacking cassettes with a selected orientation, where the cassettes have a first relatively thick side section and a second relatively thin side section, comprising the steps of:

(1) discharging the cassettes one at a time onto the upper end of a first inclined chute so that each cassette is oriented with its relatively thick side section resting on the floor of said first chute;

(2) sliding each cassette downwardly along said first chute to a first station without changing the orientation of said cassettes;

(3) discharging each cassette from said first station by gravity onto the upper end of a second inclined chute so that said relatively thick side section engages the floor of said second chute;

(4) selectively placing a deflecting member in the path of each cassette received from said first chute, while the relatively thick side section of the cassette is engaged with the floor of said second chute, so as to cause the cassette to be deflected and fall flat on said second chute with the relatively thin side section of the cassette leading the opposite relatively thick side section of the cassette downwardly along said second chute;

(5) stopping each cassette at the bottom end of said second chute;

(6) lifting each cassette after it has reached the bottom end of said second chute away from the floor of said second chute without changing the orientation of said cassette; and (7) placing each lifted cassette in turn at the bottom of a stack of cassettes supported above said second chute.

23. A method according to claim 22 further including one of the following steps while each cassette is at said first station:

(a) imprinting a selected indicia onto the relatively thin side section of the cassette;

(b) applying a reel-locking tab to the cassette to lock the reels of the cassette against movement.

* * * * *